(12) United States Patent
Lv et al.

(10) Patent No.: US 8,432,822 B2
(45) Date of Patent: Apr. 30, 2013

(54) METHOD, SYSTEM AND DEVICE OF PACKET SAMPLING

(75) Inventors: Hong Lv, Shenzhen (CN); Peng Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 389 days.

(21) Appl. No.: 12/714,660

(22) Filed: Mar. 1, 2010

(65) Prior Publication Data

US 2010/0157837 A1 Jun. 24, 2010

Related U.S. Application Data

(63) Continuation of application No. PCT/CN2008/073000, filed on Nov. 10, 2008.

(30) Foreign Application Priority Data

Nov. 12, 2007 (CN) .......................... 2007 1 0165565

(51) Int. Cl.
*H04L 12/26* (2006.01)
*H04L 12/66* (2006.01)

(52) U.S. Cl.
USPC .......................................... 370/252; 370/352

(58) Field of Classification Search .................. None
See application file for complete search history.

(56) References Cited

U.S. PATENT DOCUMENTS

| 7,142,534 | B1 | 11/2006 | Whent et al. |
| 2007/0263545 | A1 | 11/2007 | Foster |
| 2008/0172732 | A1* | 7/2008 | Li et al. ........................ 726/15 |

FOREIGN PATENT DOCUMENTS

| CN | 1642167 A | 7/2005 |
| CN | 1917466 A | 2/2007 |
| CN | 101043453 A | 9/2007 |
| CN | 101159656 A | 11/2007 |
| WO | 2006029399 A2 | 3/2006 |

OTHER PUBLICATIONS

Reexamination Decision issued in corresponding Chinese patent application No. 200710165565.5, Aug. 12, 2010, 3 pages.
Rejection Decision issued in corresponding Chinese patent application No. 200710165565.5, Mar. 18, 2010, 10 pages.
Search report issued in corresponding European patent application No. EP08854497.8, May 21, 2010, 6 pages.
Written opinion issued in corresponding PCT application No. PCT/CN2008/073000, Feb. 5, 2009, 4 pages.
"Multiprotocol Label Switching Architecture",Network Working Group, Request for Comments: 3031, Cisco Systems, Inc., Jan. 2001,total 61 pages.
"LDP Specification", Network Working Group, Request for Comments: 3036, Cisco Systems, Inc., Jan. 2001, total 132 pages.
"LDP Specification",Network Working Group, Request for Comments: 5036, Cisco Systems, Inc, Oct. 2007, total 135 pages.

(Continued)

*Primary Examiner* — Clemence Han (57) ABSTRACT

A method and a system for sampling a packet as well as a device are disclosed herein. The method includes the following steps: a notification node of an LSP sends obtained information about the protocol type of a packet to a specific netflow sampling entity; the netflow sampling entity determines the protocol type of the packet according to the information about the protocol type after receiving the packet, and samples the packet according to the determined protocol type. Through the embodiments of the present invention, the accuracy of netflow sampling is improved significantly.

7 Claims, 4 Drawing Sheets

OTHER PUBLICATIONS

"Cisco Systems NetFolw Services Export Version 9", Network Working Group, Request for Comments: 3954, Cisco Systems, Oct. 2004, total 30 pages.

Office action issued in corresponding to Chinese application No. 2007101655655, dated Feb. 6, 2009, and an English translation thereof, total 9 pages.

* cited by examiner

METHOD, SYSTEM AND DEVICE OF PACKET SAMPLING

CROSS-REFERENCE TO RELATED APPLICATIONS

This application is a continuation of International Application No. PCT/CN2008/073000, filed on Nov. 10, 2008, which claims priority to Chinese Patent Application No. 200710165565.5, filed on Nov. 12, 2007, both of which are hereby incorporated by reference in their entireties.

FIELD OF THE INVENTION

The present invention relates to Internet Protocol (IP) network communication, and in particular, to a method, a system and a device of packet sampling.

BACKGROUND OF THE INVENTION

Netflow collection, also called netstream collection, refers to sampling of the packets in a network. The sampling results are presented to the operator and the customer of the operator for the purpose of network planning, network detection, user monitoring, application layer monitoring, and security analysis.

In the netflow collection, the traffic sampling device such as router obtains the packet protocol type of the packet according to the packet header of the packet to be sampled, and then resolves the packet according to the packet protocol type, and finishes the packet sampling through resolution.

Currently, the Virtual Private Network (VPN) based on the Multi-Protocol Label Switch (MPLS) technology connects different branches of a private network through a Label Switching Path (LSP), thus forming a unified network.

Figure 1:
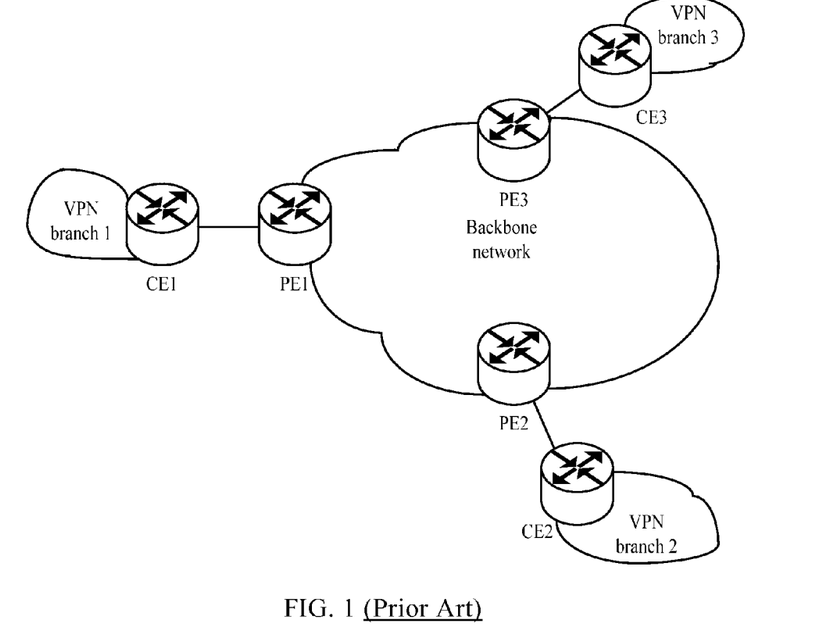
FIG. 1 shows an MPLS-based VPN network in the prior art.

FIG. 1 shows the MPLS-based VPN networking diagram. The VPN includes: a Customer Edge (CE) device, a Provider Edge (PE) router, and an intermediate (P) router. The CE device is adapted to connect the private network into a backbone network. A CE device may be a router, switch or host. The PE router is located in the backbone network, and is directly connected with the CE device. The PE router is adapted to manage VPN users, create an LSP connection between PE routers, and distribute routes between PE routers. The route distribution between PE routers is performed according to the protocols such as the Label Distribution Protocol (LDP), the Border Gateway Protocol (BGP), and the Resource ReSerVation Protocol (RSVP). The P router is a backbone router in a network of the service provider. It is not directly connected with the CE device. The P router needs to provide only the basic MPLS forwarding capability, and does not maintain VPN information.

During transmission of a packet between PE1 and PE2, when the packet arrives at PE1, the packet is labeled and encapsulated with an MPLS packet header. The packet arrives at PE2 along an LSP composed of a series of P routers according to the label and the label forwarding table. The PE2 removes the label in the packet, and takes the MPLS packet header off the packet before the packet is further forwarded.

The PE1, the PE2 or the intermediate P router may need to collect netflows. For the ingress node PE1, because the packet received by the PE1 is not encapsulated with an MPLS header, the PE1 can obtain the protocol type of the packet by resolving the packet header directly, and then resolve the packet according to the packet protocol type. The packet sampling is performed through resolution. For the egress node PE2, the packet protocol type of the label carried in the packet can be obtained through searching the label distribution information, the packet is resolved according to the packet protocol type, and the packet sampling is performed through resolution. For the intermediate P router, the packet received by the P router is encapsulated with an MPLS header, and the packet protocol type cannot be obtained by resolving the packet header. Conventionally, the netflows are collected on the P router in the following two modes:

Mode 1: The range of labels is sorted out for the PE. For example, a label range corresponds to the packet protocol type "L2VPN", and another label range corresponds to the packet protocol type "L3VPN". Afterward, static configuration is performed on the P router. The configured P router stores the information about the packet protocol type corresponding to different label ranges allocated for the PEs. When a P router collects netflows, the P router obtains the address of the node PE2 according to the outer label value carried in the packet, and then searches for the label range of the inner layer carried in the packet among the label information corresponding to the PE2 address. The protocol type corresponding to the label range is the protocol type of the packet. After the packet protocol type is determined, the packet can be resolved according to the packet protocol type. The packets are sampled through resolution. For example, if the packet protocol type is determined as Internet Protocol Version 4 (IPv4), the packets are resolved according to the IP header to implement sampling. If the packet protocol type is determined as L2 Ethernet, the packet is resolved according to the Ethernet header to implement sampling.

Mode 2: The P router determines the packet protocol type of the MPLS packet by testing the Cyclical Redundancy Check (CRC) code. For example, the P router assumes that the packet protocol type is IPv4, and then calculates the CRC code of the IPv4, and checks whether the calculated CRC code is consistent with the CRC code carried in the packet. If they are consistent, it indicates that the packet protocol type is IPv4; if they are not consistent, the P router assumes that the packet protocol type is Internet Protocol Version 6 (IPv6) and then calculates the CRC code of the IPv6, and checks whether the calculated CRC code is consistent with the CRC code carried in the packet. That process goes on until the matching packet protocol type is found.

In the process of implementing the present invention, the inventor finds at least the following defects in the above conventional technical arts:

For the first mode of collecting netflows through the P router, it is necessary to sort out the label range and perform configuration on the P router. Once the label range changes, the configuration information on each P router needs to be modified accordingly. The modification is performed manually, and is vulnerable to errors. Moreover, the sorting of the label range is not detailed enough. Consequently, it is not perform accurate sampling for the packet. For example, currently the label range is sorted according to L3VPN and L2VPN, but the L2VPN is subdivided into different link layers such as Point to Point Protocol (PPP), thus making it impossible to determine whether the packet is resolved according to the Ethernet header or according to the IP header before sampling. Meanwhile, each different manufacturer sorts the label range according to different criteria in the case of interworking between different manufacturers, thus leading to inaccurate sampling.

In the second mode of netflow collection through the P router described above, CRC calculation needs to be performed repeatedly, thus decreasing the sampling efficiency drastically. Moreover, due to low precision, the packet protocol type tends to be determined incorrectly, and the packet sampling is inaccurate.

SUMMARY OF THE INVENTION

The present invention provides a method, a system and a device of packet sampling to overcome inaccuracy of packet sampling performed for an intermediate node on an LSP in an MPLS-based network in the prior art.

A method of packet sampling is provided in an embodiment of the present invention. The method includes:

sending, by a node that notifies an LSP, obtained information about a protocol type of the packet to a specific netflow sampling entity; and determining, by the netflow sampling entity, the protocol type of the packet according to the information about the protocol type after receiving the packet, and sampling the packet according to the determined protocol type.

A system of packet sampling is provided in an embodiment of the present invention. The system includes:

a notification router, configured to send obtained information about a protocol type of a packet to a specific netflow sampling device; and a netflow sampling device, configured to determine the protocol type of the packet according to the information about the protocol type after receiving the packet, and sample the packet according to the determined protocol type.

A notification router is provided in an embodiment of the present invention. The router includes:

an obtaining unit, configured to obtain information about a protocol type of the packet;

a determining unit, configured to determine a netflow sampling device that requires the information; and a sending unit, configured to send the information about the protocol type of the packet to the netflow sampling device determined by the determining unit, where the information is obtained by the obtaining unit.

The present invention provides the following benefits: In the technical solution under the present invention, the notification node capable of obtaining the protocol type of the packet on the LSP sends the obtained information about the protocol type of the packet to the netflow sampling entity, and the netflow sampling entity determines the protocol type of the packet according to the received information about the protocol type of the packet, thus finishing sampling. The information about the protocol type of the packet is sent by the notification node to the netflow sampling entity proactively without manual configuration or modification, thus improving accuracy of the information about the protocol type of the packet significantly.

DETAILED DESCRIPTION OF THE EMBODIMENTS

In order for the intermediate node of an LSP in an MPLS-based network to obtain accurate information about the protocol type of the packet and perform accurate sampling of the packet, a packet sampling method is provided in an embodiment of the present invention. In this method, the notification node capable of obtaining the protocol type of the packet on the LSP sends the obtained information about the protocol type of the packet to a specific netflow sampling entity; and in the process of sampling the received packet, the netflow sampling entity determines the protocol type of the packet according to the received information about the protocol type, and then resolves the packet according to the determined protocol type, thus finishing the sampling.

Figure 2:
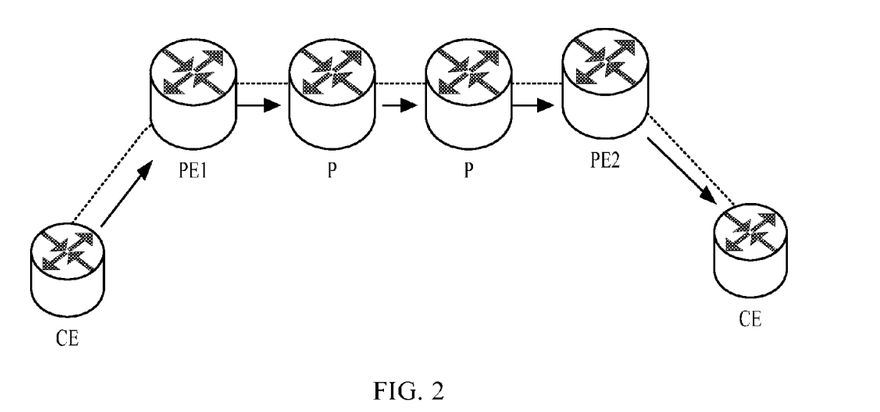
FIG. 2 is a network topology view applicable to a method provided in an embodiment of the present invention.

FIG. 2 shows an MPLS-based network topology applicable to the packet sampling method provided in an embodiment of the present invention. An LSP is composed of an ingress node, an egress node, intermediate nodes between the ingress node and the egress node. For an MPLS-based VPN, the ingress node and the egress node are PE routers, and the intermediate nodes are P routers. For example, in LSP "PE1→PE2", the ingress node is PE1, the egress node is PE2, and the P routers between PE1 and PE2 are intermediate nodes.

Figure 3:
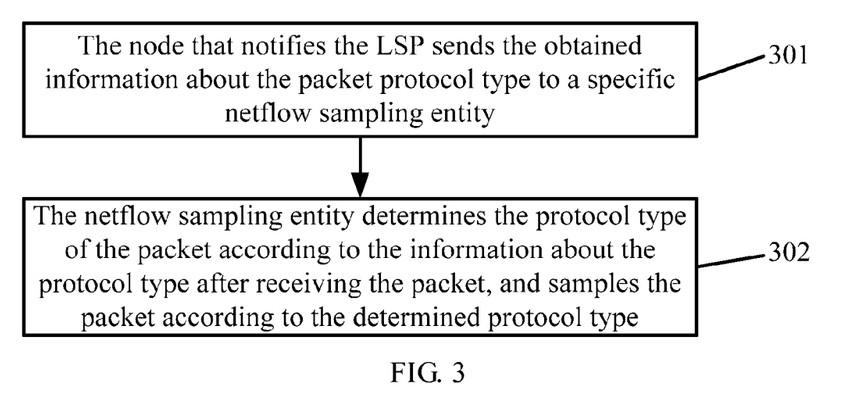
FIG. 3 is a flowchart of a method provided in an embodiment of the present invention.

The packet sampling method under the present invention is detailed below by reference to FIG. 2 and FIG. 3.

A packet sampling method provided in an embodiment of the present invention includes the following steps:

301: The notification node of the LSP sends obtained information about the protocol type of a packet to a specific netflow sampling entity.

302: The netflow sampling entity determines the protocol type of the packet according to the information about the protocol type after receiving the packet, and samples the packet according to the determined protocol type.

In step 301, the packet received by the ingress node of the LSP is not encapsulated with an MPLS header, and the ingress node can obtain the protocol type of the packet by resolving the packet header. Therefore, the ingress node of the LSP can serve as a notification node to send the information about the protocol type of the packet to the netflow sampling entity.

The label distribution node distributes a label to the LSP, and stores the label distribution information. The label distribution information includes the distributed label and the corresponding protocol type. Therefore, the label distribution node can also serve as a notification node to send the information about the protocol type of the packet to the netflow sampling entity. For the downstream label distribution mode, the label distribution node is an egress node of the LSP; for the upstream label distribution mode, the label distribution node is the ingress node of the LSP.

When the ingress node of the LSP serves as a notification node, the inner label distributed to the packet is obtained by the notification node according to the stored label distribution information, and the protocol type of the packet is obtained by the notification node resolving the packet header. Afterward, the corresponding relation between the inner label and the protocol type is sent by the notification node as information about the protocol type of the packet to the netflow sampling entity; or, by extending the MPLS header of the packet, the inner label and the protocol type are encapsulated into the MPLS header of the packet by the notification node, and the packet is sent to the netflow sampling entity by the notification node. The netflow sampling entity obtains the protocol type of the packet by resolving the MPLS header of the packet.

When the label distribution node serves as a notification node, the distributed inner label and the corresponding protocol type are sent as information about the protocol type of the packet to the netflow sampling entity.

The netflow sampling entity may be an intermediate node of the LSP, for example, the P router of the VPN. The ingress node of the LSP or the label distribution node can determine the intermediate node covered by the LSP according to the stored label path information, and send the obtained information about the protocol type of the packet to the intermediate node covered by the LSP. Alternatively, the ingress node or the label distribution node of the LSP queries the configuration information, uses the intermediate node specified in the configuration information as a netflow sampling entity, and sends the obtained information about the protocol type of the packet to the netflow sampling entity.

Alternatively, the netflow sampling entity may also be a third-party server, for example, a sampler for the special purpose of netflow sampling. The third-party server may be configured manually, or configured by the system. In order for the third-party server to perform packet sampling, the notification node needs to send the information about the protocol type of the packet to the third-party server, and the intermediate node needs to send the packet to be sampled to the third-party server. The third-party server determines the protocol type of the packet according to the information about the protocol type and the label content carried in the packet to be sampled.

Besides, when sending the information about the protocol type of the packet, the ingress node of the LSP or the label distribution node may send the information to the netflow sampling entity directly, or send the information to a forwarding entity which forwards the information to the netflow sampling entity.

The description mode of the protocol type of the packet can be predefined. For example, "1" represents the "L2VPN ip interworking" protocol type, "2" represents the "L2VPN ethernet" protocol type, and "3" represents the "L3VPN" protocol type. In this way, only the symbol of the protocol type of the packet needs to be sent, and more resources are saved.

The sending format of the information about the protocol type of the packet may be predefined through the existing V9 template, or may be a newly defined format.

For the purpose of sending the information about the protocol type of the packet, the information may be carried in an existing packet or a newly added packet. It is better to let the information be carried in an existing packet, if the sending node is an ingress node of the LSP. In this case, the information about the protocol type of the packet may be carried in a label stack field of the existing packet header or a newly added header field.

In step 302, upon receiving a packet, the netflow sampling entity determines the protocol type of the packet according to the information about the protocol type from the notification node in the following way:

According to the outer label carried in the packet, the netflow sampling entity searches the label forwarding table to determine the egress node information corresponding to the outer label. Subsequently, among the information about the protocol type of the packet from the egress node, the netflow sampling entity searches for the protocol type which corresponds to the inner label and is carried in the packet. Such a protocol type is the protocol type of the packet.

For example, the P router already stores three pieces of protocol type information from PE1 and PE2.

The protocol type information from PE1 is as follows:
Inner label 30, protocol type IPv4;
Inner label 31, protocol type IPv6; and
Inner label 48, protocol type L2VPN ethernet.

The protocol type information from PE2 is as follows:
Inner label 31, protocol type IPv4;
Inner label 37, protocol type IPv6; and
Inner label 49, protocol type L2VPN ethernet.

The P router receives a packet with an outer label "1048" and an inner label "31". When sampling the packet, the P router determines that the outer label "1048" corresponds to the egress node "PE1" by searching its label forwarding table, and then searches for the protocol type corresponding to the inner label "31" among the information about the protocol type of the packet from PE1. As a result of searching, it is determined that the inner label "31" corresponds to the protocol type "IPv6". Therefore, the packet is resolved according to the packet header of the IPv6, and the packet sampling is finished.

The foregoing instance takes two layers of labels as an example. In the two layers of labels, the inner label refers to the lowest-layer label in the label stack, and the outer label refers to the highest-layer label in the label stack. If more than two layers of labels exist, the principles are the same as two layers of labels, but the label forwarding table needs to be queried according to the intermediate label between the inner label and the outer label, and the egress node corresponding to the inner label is found from level to level, and then the protocol type corresponding to the inner label is searched out of the information about the protocol type of the packet sent by the egress node.

Besides, the netflow sampling entity can decide whether to receive information about the protocol type of the packet from the notification node according to local configuration of enabling the MPLS sampling. If the netflow sampling entity decides not to receive the information, the netflow sampling entity needs to notify the notification node or the forwarding entity to resend the information about the protocol type of the packet when configuring the enabling of MPLS sampling subsequently.

Figure 4:
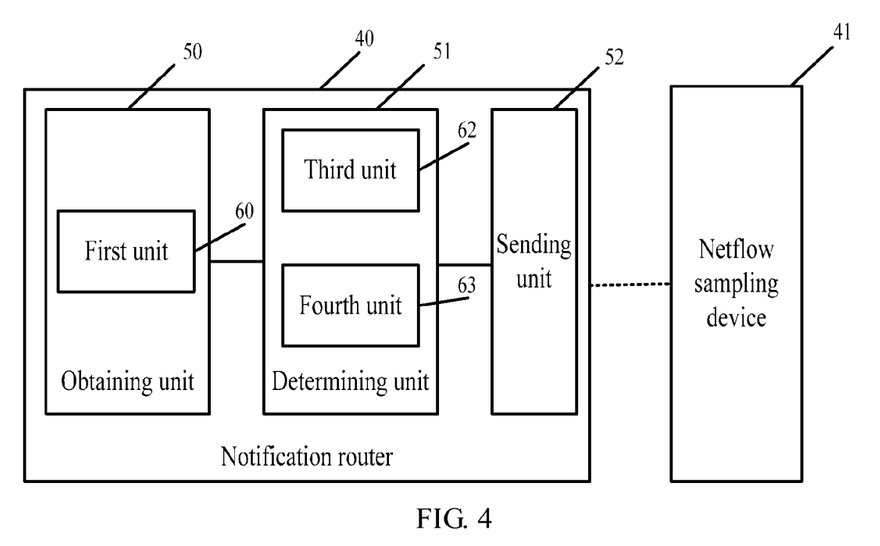
FIG. 4 shows a structure of a system provided in an embodiment of the present invention.
Figure 5:
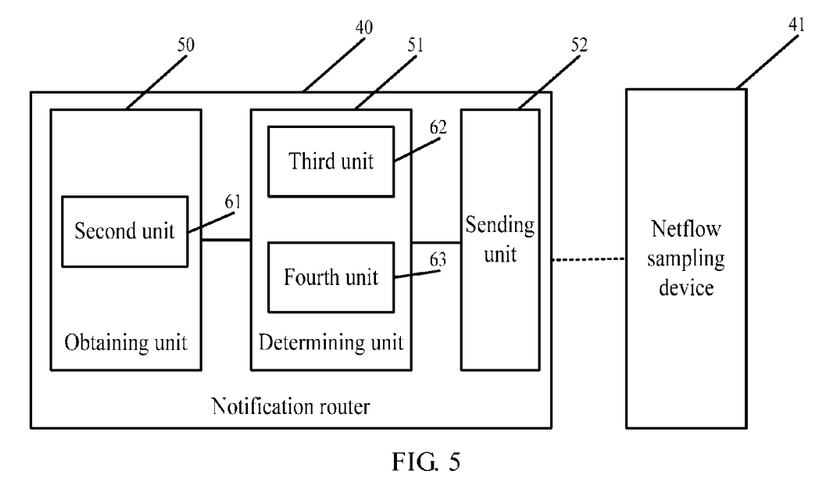
FIG. 5 shows another structure of a system provided in an embodiment of the present invention.

As shown in FIG. 4 and FIG. 5, a system of packet sampling is provided in an embodiment of the present invention.

The system includes:
a notification router 40, configured to send obtained information about the protocol type of a packet to a specific netflow sampling device, where the notification router may be an ingress node or label distribution node on the LSP; and
a netflow sampling device 41, configured to determine the protocol type corresponding to the packet according to the information about the protocol type after receiving the packet, and sample the packet according to the determined protocol type, where the netflow sampling device may be an intermediate node or a third-party server on the LSP.

The notification router 40 includes:
an obtaining unit 50, configured to obtain the information about the protocol type of the packet;
a determining unit 51, configured to determine the netflow sampling device that requires the information; and
a sending unit 52, configured to send the information about the protocol type of the packet to the netflow sampling device determined by the determining unit, where the information is obtained by the obtaining unit.

If the notification router is the ingress node of the LSP, the obtaining unit 50 includes:

a first unit 60, configured to obtain the outer label and the inner label distributed to the packet according to the stored label distribution information, and obtain the protocol type of the packet by resolving the packet header.

If the notification router is the label distribution node of the LSP, the obtaining unit 50 includes:

a second unit 61, configured to obtain the distributed inner label and the corresponding protocol type according to the stored label distribution information.

The determining unit 51 includes:

a third unit 62, configured to determine the intermediate node covered by the LSP according to the stored label path information, and use the determined intermediate node as a netflow sampling device; and a fourth unit 63, configured to use the intermediate node specified in the configuration information as a netflow sampling device according to the configuration information.

The netflow sampling device 41 is further configured to notify the notification router to resend the information about the protocol type of the packet when configuring enabling of sampling of the netflow sampling device.

Figure 6:
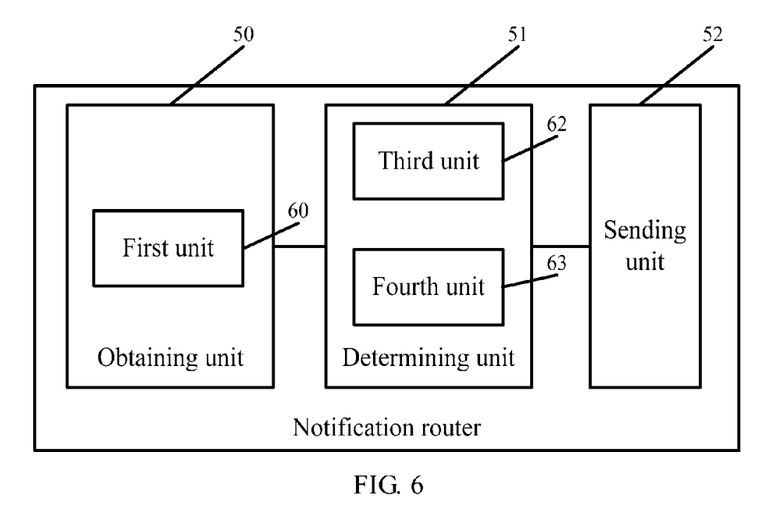
FIG. 6 shows a structure of a device provided in an embodiment of the present invention.
Figure 7:
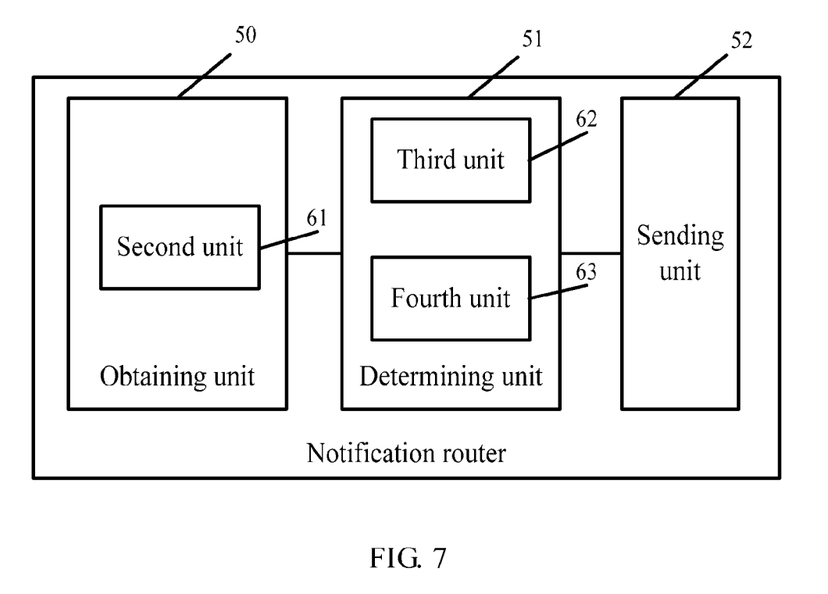
FIG. 7 shows another structure of a device provided in an embodiment of the present invention.

A notification router is provided in an embodiment of the present invention. As shown in FIG. 6 and FIG. 7, the router includes:

an obtaining unit 50, configured to obtain the information about the protocol type of the packet;

a determining unit 51, configured to determine the netflow sampling device that requires the information; and a sending unit 52, configured to send the information about the protocol type of the packet to the netflow sampling device determined by the determining unit, where the information is obtained by the obtaining unit.

Specifically, the notification router may be an ingress node of the LSP or a label distribution node.

If the notification router is the ingress node of the LSP, the obtaining unit 50 includes:

a first unit 60, configured to obtain the outer label and the inner label distributed to the packet according to the stored label distribution information, and obtain the protocol type of the packet by resolving the packet header;

If the notification router is the label distribution node of the LSP, the obtaining unit 50 includes:

a second unit 61, configured to obtain the distributed inner label and the corresponding protocol type according to the stored label distribution information.

The determining unit 51 includes:

a third unit 62, configured to determine the intermediate node covered by the LSP according to the stored label path information, and use the determined intermediate node as a netflow sampling device; and a fourth unit 63, configured to use the intermediate node specified in the configuration information as a netflow sampling device according to the configuration information.

To sum up, the benefits of the embodiments of the present invention are:

In the technical solution under the present invention, the node capable of obtaining the protocol type of the packet on the LSP sends the obtained information about the protocol type of the packet to the netflow sampling entity, and the netflow sampling entity determines the protocol type of the packet according to the received information about the protocol type of the packet, thus finishing sampling. The information about the protocol type of the packet is sent by the node to the netflow sampling entity proactively without manual configuration or modification, thus improving accuracy of the information about the protocol type of the packet significantly.

Moreover, it is not necessary to sort the label range in the technical solution under the present invention, thus avoiding inaccuracy of sampling in the prior art caused by rough sorting of the label range. At the same time, it is prevented that the sampling is inaccurate because each different manufacturer sorts the label range according to different criteria in the case of interworking between different manufacturers.

It is apparent that those skilled in the art can make various modifications and variations to the present invention without departing from the spirit and scope of the present invention. The present invention is intended to cover such modifications and variations provided that they fall in the scope of protection defined by the following claims or their equivalents.

What is claimed is:

1. A notification router adapted for sampling a packet for an intermediate node on a Label Switching Path (LSP) in a Multi-Protocol Label Switch, MPLS-based network, comprising:

an obtaining unit, configured to obtain information about a protocol type of a packet;

a determining unit, configured to determine a netflow sampling device that requires the information; and a sending unit, configured to send the information about the protocol type of the packet to the netflow sampling device, wherein:

the notification router is an ingress node of the LSP, and the obtaining unit comprises:

a unit, configured to obtain an outer label and an inner label distributed to the packet according to stored label distribution information, and obtain the protocol type of the packet by resolving a packet header of the packet.

2. A notification router adapted for sampling a packet for an intermediate node on a Label Switching Path (LSP) in a Multi-Protocol Label Switch, MPLS-based network, comprising:

an obtaining unit, configured to obtain information about a protocol type of a packet;

a determining unit, configured to determine a netflow sampling device that requires the information; and a sending unit, configured to send the information about the protocol type of the packet to the netflow sampling device, wherein:

the notification router is a label distribution node of the LSP, and the obtaining unit comprises:

a unit, configured to use an inner label distributed to the packet and a corresponding protocol type as the information about the protocol type of the packet.

3. A notification router adapted for sampling a packet for an intermediate node on a Label Switching Path (LSP) in a Multi-Protocol Label Switch, MPLS-based network, comprising:

an obtaining unit, configured to obtain information about a protocol type of a packet;

a determining unit, configured to determine a netflow sampling device that requires the information; and a sending unit, configured to send the information about the protocol type of the packet to the netflow sampling device, wherein the determining unit comprises:

a unit, configured to use an intermediate node specified in configuration information as the netflow sampling device according to the configuration information.

4. A method for sampling a packet for an intermediate node on a Label Switching Path (LSP) in a Multi-Protocol Label Switch (MPLS)-based network, comprising:

determining, by a netflow sampling entity, a protocol type of the packet according to information about the protocol type of the packet obtained by and sent from a notification node of the LSP after receiving the packet transmitted for packet sampling for the intermediate node; and sampling, by the netflow sampling entity, the packet according to the determined protocol type;

wherein the information about the protocol type of the packet contains a corresponding relation between an inner label and the protocol type of the packet, and the step of determining the protocol type of the packet comprises:

determining the protocol type corresponding to the inner label carried in the packet, and using the determined protocol type as the protocol type of the packet.

5. The method for sampling a packet according to claim 4, wherein the step of obtaining, by the notification node, the information about the protocol type of the packet comprises:

obtaining, by an ingress node, the inner label distributed to the packet according to a stored label distribution information, and obtaining the protocol type of the packet by resolving a packet header of the packet, if the notification node is the ingress node; or using, by a label distribution node, the protocol type corresponding to the inner label distributed to the packet as the information about the protocol type of the packet, if the notification node is the label distribution node.

6. A method for sampling a packet for an intermediate node on a Label Switching Path (LSP) in a Multi-Protocol Label Switch (MPLS)-based network, comprising:

determining, by a netflow sampling entity, a protocol type of the packet according to information about the protocol type of the packet obtained by and sent from a notification node of the LSP after receiving the packet transmitted for packet sampling for the intermediate node; and sampling, by the netflow sampling entity, the packet according to the determined protocol type; wherein the method further comprising:

the notification node determining the netflow sampling entity; and wherein the step of determining the netflow sampling entity comprises using an intermediate node specified in configuration information as the netflow sampling entity according to the configuration information.

7. A method for sampling a packet for an intermediate node on a Label Switching Path (LSP) in an Multi-Protocol Label Switch (MPLS)-based network, comprising:

determining, by a netflow sampling entity, a protocol type of the packet according to information about the protocol type of the packet obtained by and sent from a notification node of the LSP after receiving the packet transmitted for packet sampling for the intermediate node; and sampling, by the netflow sampling entity, the packet according to the determined protocol type, wherein:

the information about the protocol type of the packet sent to the netflow sampling entity is carried in one of a label stack field of a packet header of the packet and a newly added packet header field of the packet.

* * * * *